United States Patent [19]
Summers et al.

[11] 3,877,076
[45] Apr. 15, 1975

[54] SAFETY HAT ENERGY ABSORBING LINER

[75] Inventors: James J. Summers, Bethel Park; Harry W. Austin, Monroeville, both of Pa.

[73] Assignee: Mine Safety Appliances Company, Pittsburgh, Pa.

[22] Filed: May 8, 1974

[21] Appl. No.: 468,013

[52] U.S. Cl. .................................................. 2/3 R
[51] Int. Cl. ................................................ A42b 1/08
[58] Field of Search ............ 2/3 R, 3 A, 3 B, 3 C, 6, 2/8

[56] References Cited
UNITED STATES PATENTS

| | | | |
|---|---|---|---|
| 2,971,195 | 2/1961 | Voss | 2/3 R |
| 3,208,080 | 9/1965 | Hirsch | 2/3 R |
| 3,447,163 | 6/1969 | Bothwell et al. | 2/3 R |
| 3,616,463 | 11/1971 | Theodore et al. | 2/3 R |
| 3,729,744 | 5/1973 | Rappleyea | 2/3 R |
| 3,820,163 | 6/1974 | Rappleyea | 2/3 R |
| 3,829,900 | 8/1974 | Marangoni | 2/3 R |

FOREIGN PATENTS OR APPLICATIONS

| | | | |
|---|---|---|---|
| 1,108,502 | 3/1968 | United Kingdom | 2/3 R |

*Primary Examiner*—Alfred R. Guest
*Attorney, Agent, or Firm*—Brown, Murray, Flick & Peckham

[57] ABSTRACT

An energy absorbing liner for a safety hat includes a curved shell and a plurality of laterally spaced stiff permanently deformable hollow shock absorbing members having inner and outer ends integrally connected to the shell and substantially perpendicular to it. The liner is of a shape to fit inside a safety hat with the shock absorbing members substantially perpendicular to the overlying wall of the hat.

8 Claims, 8 Drawing Figures

PATENTED APR 15 1975     3,877,076
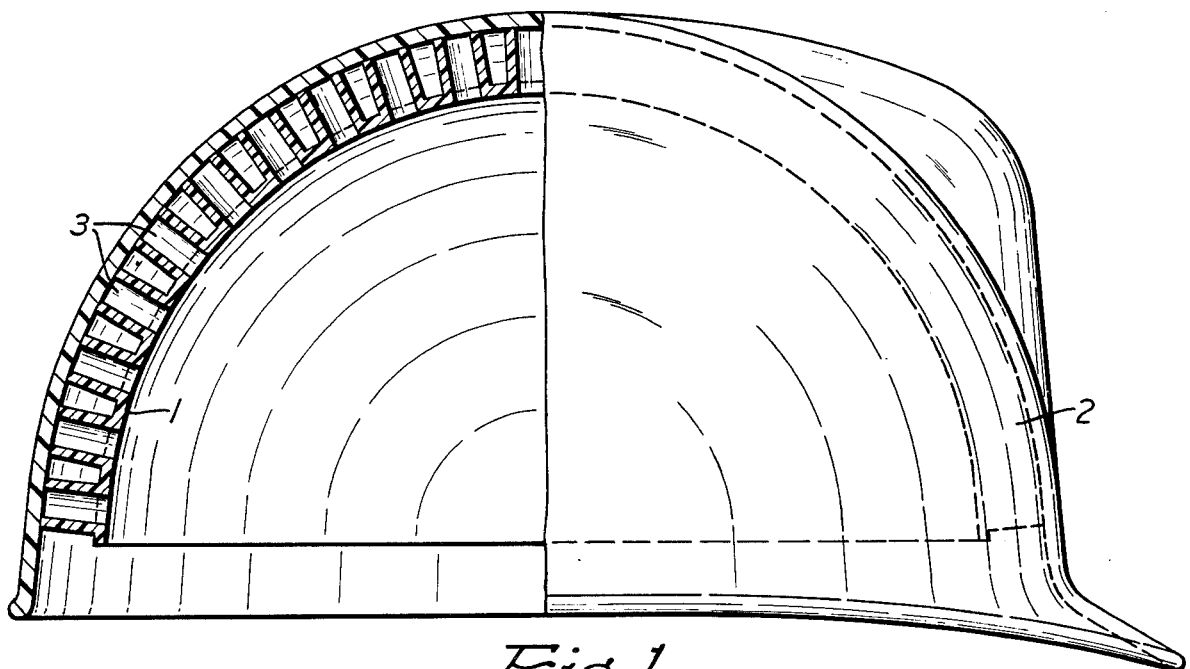
Fig.1
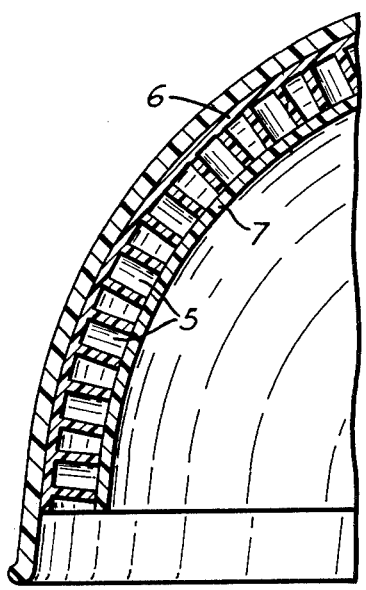    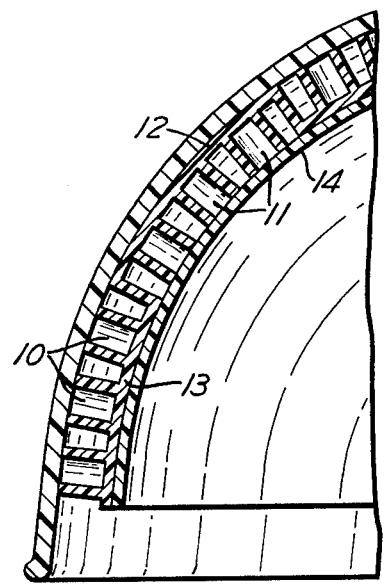    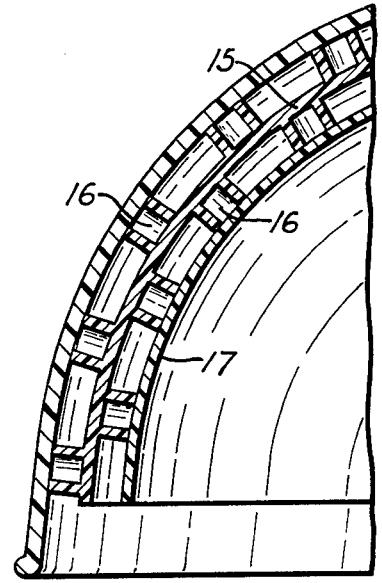
Fig.2     Fig.3     Fig.4
   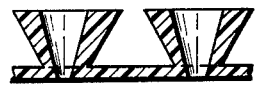   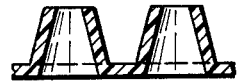   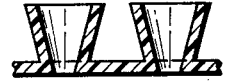
Fig.5    Fig.6    Fig.7    Fig.8

SAFETY HAT ENERGY ABSORBING LINER

Safety hats or helmets are often provided with liners made from material that will crush when subjected to a predetermined pressure, whereby to absorb as much as possible of the impact energy in order to protect the head of the wearer. For this purpose, solid liners of foamed plastic have been used, as well as honeycombs filled with foamed plastic. In pending patent application, Ser. No. 392,957, filed Aug. 30, 1973 which issued as U.S. Pat. No. 3,829,900, a liner is shown that is formed from stacks of stiff, permanently deformable tubes arranged in parallel rows. This is an effective energy absorbing liner, but it requires assembling and confining a large number of small tubes which, of course, requires time.

It is among the objects of this invention to provide a safety hat energy absorbing liner which will furnish a maximum of energy absorption within a minimum space, which is lightweight and economical to produce, and in which energy absorbing members are molded into the liner and do not have to be handled separately.

The invention is illustrated in the accompanying drawings, in which

FIG. 1 is a side view of a safety hat, partly broken away, containing the new liner;

FIGS. 2, 3 and 4 are fragmentary vertical sections of three different modifications; and FIGS. 5 to 8 are fragmentary longitudinal sections through four different embodiments of shock absorbing members.

Referring to FIG. 1 of the drawings, the liner is molded to form a dome-shape shell 1 that will fit within a safety hat 2 or helmet. Projecting from the upper side of the shell is a large number of hollow shock absorbing members 3 molded integrally with the shell and engaging the inner surface of the safety hat. These members are substantially perpendicular to the areas of the shell to which they are joined and also perpendicular to the overlying wall of the hat, and each shock absorbing member is independent of the others. The length of the projection is not critical, except that they probably should not be any shorter than about one-quarter inch, nor so long as to require a hat that would by unduly large. The projecting members preferably are open at least at one end, those shown being open at both ends. Those shown in FIG. 1 also are cylindrical, but they can be other shapes, such as tapering in either direction as shown in FIGS. 5 to 8. In some cases it may be desirable for the side walls of the projections to be gradually reduced or increased in thickness from the shell outwardly, as shown in FIGS. 5 and 6. The liner can be held in the hat in any suitable manner, which forms no part of this invention.

The liner is made of a stiff material that will deform permanently if subjected to pressure above a predetermined value. The shock absorbing members must not spring back to their original shape when the pressure on them is released. They must absorb the energy that deforms them and not transmit it to the head of the wearer of the hat. Therefore, the liner is molded from a foamed plastic, such as polystyrene or polyurethane. These molded plastic materials are crushable and absorb energy as their foam cell walls break down during crushing.

In the second embodiment of the invention shown in FIG. 2, the shock absorbing members 5 project inwardly from the inner or concave surface of the dome-shape shell 6, which fits against the inside of the helmet. To prevent the inner ends of the projections from directly engaging the head, a second or inner dome-shape shell 7 of suitable material fits against the inner ends of the projections.

In the further modification shown in FIG. 3, some of the shock absorbing members 10 project from one side of the shell and the rest 11 from the opposite side. To permit this, the areas 12 of the shell that support the inwardly directed projections are offset outwardly relative to the areas 13 that support the outwardly directed projections. Like the preceding embodiment, this one requires a second shell 14 to space the inner ends of the inwardly directed projections from the head.

Finally, the embodiment of the invention shown in FIG. 4 makes use of a molded dome-shape shell 15, from both sides of which shock absorbing members 16 project. The inner and outer members could be in alignment, but those illustrated are staggered. The inner ends of the inner projections are concealed behind a second or inner shell 17.

It should be understood that although complete liners are shown and described herein, the invention is equally applicable to partial liners. For example, the shell and shock absorbing members could be located only in the upper part of the crown of the hat, or only around its lower portion if desired.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. An energy absorbing liner for a safety hat, comprising a curved shell and a plurality of laterally spaced stiff permanently deformable hollow shock absorbing members having inner and outer ends, said members being integrally connected at one end to said shell and substantially perpendicular thereto, and the liner being of a shape to fit inside a safety hat with said shock absorbing members substantially perpendicular to the overlying wall of the hat.

2. An energy absorbing liner according to claim 1, in which said shock absorbing members project from the concave side of said shell.

3. An energy absorbing liner according to claim 1, in which said shock absorbing members project from the convex side of said shell to space the shell from the hat.

4. An energy absorbing liner according to claim 1, in which some of said shock absorbing members project from one side of said shell, and the rest of said members project from the opposite side of the shell.

5. An energy absorbing liner according to claim 1, in which said shock absorbing members are cylindrical.

6. An energy absorbing liner according to claim 1, in which said shock absorbing members are tapered lengthwise.

7. An energy absorbing liner according to claim 1, in which the ends of said shock absorbing members opposite the shell are open.

8. An energy absorbing liner according to claim 1, in which said shock absorbing members are open at both ends.

* * * * *